United States Patent [19]
Da Silva et al.

[11] Patent Number: 5,435,338
[45] Date of Patent: Jul. 25, 1995

[54] EQUIPMENT FOR THE INTERCONNECTION OF TWO LINES TO ALLOW RUNNING OF PIGS

[75] Inventors: José Eduardo M. Da Silva; Marcelino G. F. M. Gomes; Fernando José M. Nagle, all of Rio de Janeiro, Brazil

[73] Assignee: Petroleo Brasileiro S.A. - Petrobras, Rio de Janeiro, Brazil

[21] Appl. No.: 100,918

[22] Filed: Aug. 3, 1993

[30] Foreign Application Priority Data

Aug. 3, 1992 [BR] Brazil .............................. 19203008

[51] Int. Cl.⁶ .............................................. B08B 9/02
[52] U.S. Cl. ..................... 137/242; 15/104.062; 137/268
[58] Field of Search .................. 137/242, 268; 15/3.5, 15/104.062, 104.63; 166/70

[56] References Cited

U.S. PATENT DOCUMENTS

| | | | |
|---|---|---|---|
| 3,186,014 | 6/1965 | Allen | 15/104.062 |
| 3,224,247 | 12/1965 | Barrett | 15/104.062 X |
| 3,246,666 | 4/1966 | Park et al. | 137/268 |
| 3,288,163 | 11/1966 | Craven | 15/140.062 X |
| 3,397,570 | 8/1968 | Pfrehm | 15/104.062 X |
| 3,504,523 | 4/1970 | Layhe | 137/268 X |
| 3,562,014 | 2/1971 | Childers | 15/104.062 X |
| 4,574,830 | 3/1986 | Rickey et al. | 15/104.062 X |
| 5,004,048 | 4/1991 | Bode | 166/70 |

Primary Examiner—Stephen M. Hepperle
Attorney, Agent, or Firm—Sughrue, Mion, Zinn, Macpeak & Seas

[57] ABSTRACT

The present invention relates to an equipment for the interconnection of two lines to allow running of pigs. Particularly, it is applied to subsea pipelines. This device allows the pigging in installations with restraint accessibility. This equipment allows that pigs launched from the first site into the first line, return via the second line back to the first site. It is of a modular conception, and can be installed at any equipment located at the interconnection point of the two lines, even for existent facilities.

2 Claims, 2 Drawing Sheets

007
EQUIPMENT FOR THE INTERCONNECTION OF TWO LINES TO ALLOW RUNNING OF PIGS

BACKGROUND OF THE INVENTION

This patent specification refers to an equipment enabling the connection between two lines to allow the passage of a pig.

The present invention refers to an equipment in the form of an interchangeable accessory module, to be installed against a system for controlling/carrying fluid material, to enable the connection between two lines to allow the application of a pig.

More specifically, it relates to the passage of a pig through a piping carrying oil from a production well that may be clogged by the formation of a crystslised material, called wax, and thus reduce the flow of the fluid material or even stop it, enabling a pig to go to the obstructed location, to remove the undesirable formation and return to a place close to the point where it was introduced in said piping.

DESCRIPTION OF THE PRIOR ART

Hitherto, one of the most efficient methods for mechanically removing undesirable material accumulated inside a fluid-carrying piping has been the scraping of the inside portion of said piping by means of a travelling member, called pig, as known by those skilled in the art.

The term "pig" was borrowed from English instead of "scraper", as referred to in the purchase specifications in the Brazilian market, because it is universally adopted and its Portuguese translation as "raspador" (scraper) would restrict the scope of use of such devices, which, apart from just removing products from a piping, are employed to separate products in order to minimize contamination, to drive fluids inside a piping, to calibrate the piping diameter or to determine its working volume, apart from other applications that may arise to cope with new problems.

A pig is a piece made of a polymeric material, generally in the shape of a cylinder or a sphere, or of a combination of parts, also of polymeric material, in the shape of discs joined by a common shaft, which can be made of the same material or of metal or pivoted sections, and said discs of polymeric material can also have, between them, abrasive parts in the shape of discs or of abrasive straps applied over the cylindrical member or inserted between the discs. Such pig can be made of elastomeric polymers having a stable structure or a sponge-like nature enabling a reasonable elastic deformation.

The technique of applying said pig comprises the introduction of it into an opening in said piping, which we will refer to as "inlet connection", to which, once said opening is sealed by any means, is applied behind the pig a fluid under a relatively high pressure, which drives said pig to "travel" inside the piping, thus dragging the material to be displaced in front of it. At a certain point in the piping, when the whole piping length or the desired portion of it has been travelled over, there should be an opening, which we will refer to as "outlet connection", where we will take out the pig and, before such removal, the material dragged along by its "travel".

Current practice provided for the pig to be sent in one direction inside the piping and withdrawn at the end of the travel. It so happens, however, that in areas that are difficult to reach, such as a piping connected to an oil-producing well located in deep waters (as deep as 1 km or more), it is easy to reach the "inlet connection", which is located on the surface (such as a platform), but we cannot reach the "outlet connection". In such cases, when clogging occurs in a production line as a result of "wax" formation, the solution adopted, although apparently extremely drastic and of little efficiency, consists of hoisting the piping to the surface and provisionally replacing the obstructed line while the latter is cleaned by convenient means, mainly by passing a pig as described above. It is easy to visualize the great cost of replacing an undersea line, as well as the loss of time and the delay in the production of oil.

To overcome this obstacle, the prior art has developed, among other concepts not relevant for understanding the present invention, the pig passing concept referred to as "pigging loop". However, within this concept, the current practice only provides for the connection of two lines having the same diameter incorporated into the design of an undersea equipment close to an oil-producing well (e.g., a Christmas tree or a template manifold), so that a pig is sent through one of them and is returned through the other. With this design option, the production line has, compulsorily and permanently, the same diameter as the water and/or gas injection line (or a secondary production line or also an additional service line).

Although progress has been made to facilitate pig operations in pipings having portions that are difficult to reach, such as the offshore oil production pipings already described, there remains the drawback of little operational flexibility, for it requires definite modifications to the internal design of said undersea equipment (e.g., a Christmas tree or a template manifold) and lines having the same diameter, for the pig circulation, even in those cases where such pig is not necessary in view of the inherent characteristics of the fluid being carried, thus causing a significant and, above all, unnecessary increase in the costs of offshore oil-producing systems. It cannot be used either on systems already existing when the undesirable deposit formation appears late on said undersea piping, for it would force the full replacement of the whole producing system, including the fixed production equipment, causing serious losses.

SUMMARY OF THE INVENTION

The equipment provided by the present invention is intended to eliminate such drawbacks. As an accessory module to a fluid control and carrying system, such as a Christmas tree of an oil-producing well, the equipment enables a pig to pass through a long piping and be recovered at a point close to where it was introduced.

Thus, one great advantage of the present invention is its modular nature. As the module is added to an oil-producing assembly (for example, a Christmas tree), it can be installed on any equipment, even on those in operation, provided their piping diameters and connections are suitable. Thus, in order to produce a pig return condition, no expensive and complicated modifications to the internal design of a Christmas tree, for example, will be required.

The present invention enables, particularly in offshore oil-producing systems, the use of just one conception of production assembly (a Christmas tree, for example), irrespective of the type of oil produced. With the module provided by the present invention coupled with said undersea assembly is created a modular oil-producing system having large paraffin deposits. By contrast, the same modular system above, without the module as claimed, is suitable for the production of oil without having large or any wax deposit, with the further advantage of using smaller-diameter pipings for the ancillary and/or service lines, with a significant reduction in investment.

DESCRIPTION OF A PREFERRED EMBODIMENT

Figure 1:
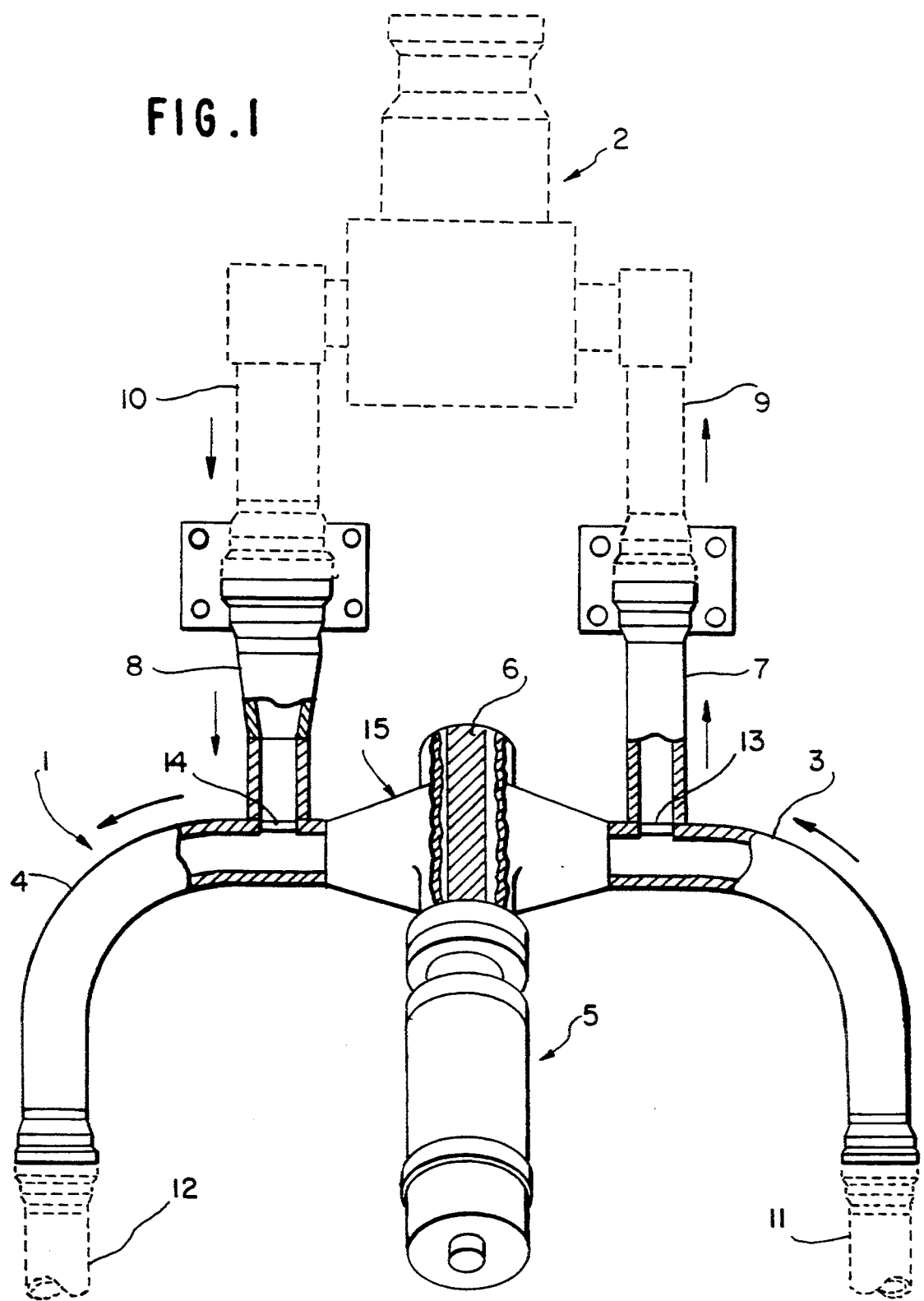
FIG. 1 shows a partial cross-section view of an arrangement of the equipment object of the present invention, in which the portions shown are only intended to define the function of the equipment, and the figure is not therefore, in any way, restrictive of the scope of the invention.
Figure 2:
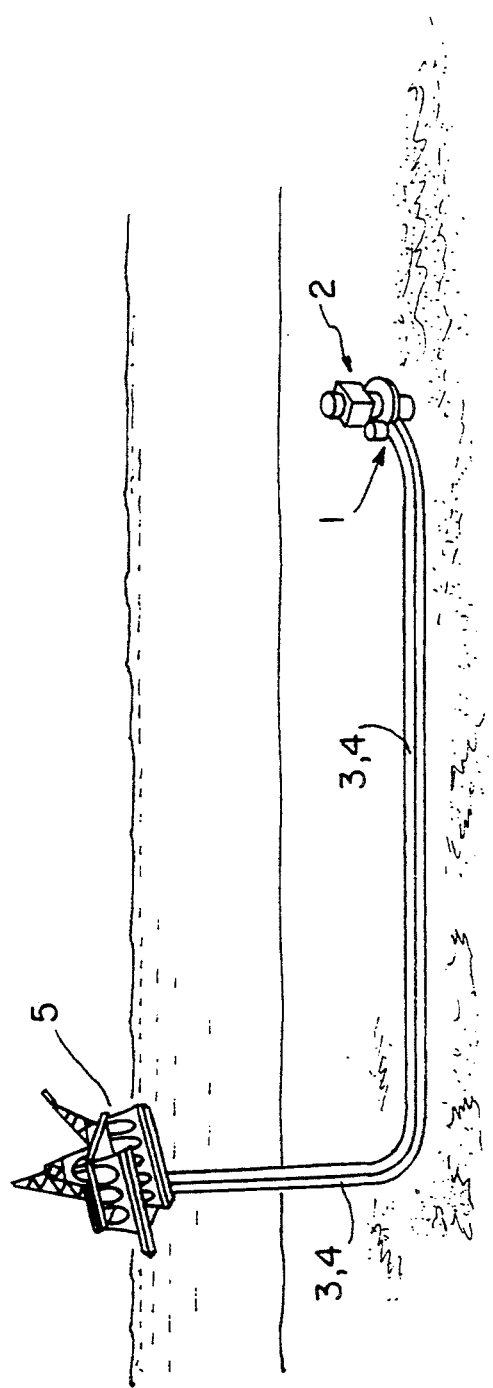
FIG. 2 shows the equipment object of the present invention installed in an offshore well with a purpose of enabling an evaluation of the relationship between the equipment and the assembly of oil-producing installations in an offshore well, yet no specific constructive features are shown.

As can be seen in FIG. 1, the equipment is generally referred to as 1, and the portions of other devices to which equipment 1 is connected are represented by dotted lines. Thus, equipment 1 is connected with a flow line mandrel, 2 (utilized together with a Christmas tree), which will not be detailed because this departs from the purpose of the invention. It is equally in communication with external equipment (including a floating platform) by means of pipings 11 and 12, as will be detailed further on.

Equipment 1 comprises in principle a central portion, 15 (represented with a partial cross section taken at the shell), where is located a valve sealing member, 6, controlled by a remote driving system forming therewith what we will refer to as valve 5, designed to block, inside body or central portion 15, with a control from the surface, a free passage which should be provided between branches 3 and 4 of equipment 1, which provide communication between body 15 of said equipment and the outer portions thereof. Thus, branches 3 and 4 are lengths of pipings preferably provided with some curvature and having, on their free ends, connections for connecting with pipings 11 and 12, which may be connected to sources of fluid under pressure or of oil from the well. It is also seen that two tubular branches, 9 and 10, of said flow line device of a Christmas tree (shown in dotted lines), are connected to two branches 7 and 8 of equipment 1, providing connections allowing fluid to flow from outside into the well and oil produced from the well to outside (whether it is a production platform or a place of accumulation). It is not specific that the fluid flow assembly should be comprised of pipes 11, 3, 7 and 9, and that those of oil should be pipes 12, 4, 8 and 10. However, only as a basis of reasoning, we will consider that assembly 10, 8, 4 and 12 is the one carrying oil from the well to outside. Thus, the flow of oil follows the direction (in a sequence) 10, 8, 4 and 12, while the fluid follows 11, 3, 7 and 9.

The abutments of pipings 7 and 8 with curved pipes 3 and 4, respectively, are provided with respective bars 13 and 14, designed to prevent a pig sent from curved branch 3 to curved branch 4, when valve 5 is open, from deviating into branch pipes 7 or 8. Thus, we see that, if it is known that the branch comprising pipings 4, 12 and henceforward up to the platform (for example) is obstructed by solids, a pig is sent from outside, passing through piping 11 into piping 3, through valve 5 when the valve is open, into piping 4 and then to piping 12, which extends to a point on the surface where the oil produced is collected, and the material obstructing the free flow of oil and obviously the pig at the end of its travel are also collected. We have seen from the present description that the pig in this case follows a route close to the Christmas tree, returning from there to the place where it was launched. Although this description is very simple, it is possible to note that a number of important operational parameters are involved:

a) the entry of oil through piping (branch) 8 is preferably but not compulsorily stopped (such interruption can be made at any point in said piping 8 or close to the Christmas tree, in piping 10) to prevent high-pressure fluid from opposing the flow of oil;

b) passage through piping 7, which exits from branch with curved piping 3, is also interrupted, preferably when obstruction caused by valve 5 is cleared, and such interruption can be made at branch 7 or piping 8, close to the Christmas tree;

c) as we have seen, the pig will pass through valve 5 (in body 15), being pushed by pressure fluid into pipings 4, 12 and extension;

d) it should be understood that the control for opening the valve 5 closing member, as well as of members (not shown) closing the flow to pipings 7 and 8 (directly or indirectly), is carried out by control means operated from the surface, these means not being shown because they are outside the scope of the present invention;

e) generally, the two pipings connecting the platform on the surface (for example) and the well and also connecting equipment 1 with such two operating stations represented by lengths of pipings 11 and 12 and their extension (not shown), this meaning that the pig, when launched by means of a high pressure fluid through said fluid line 11, will return in body 15 of valve 5 and push outside the accumulated products ("wax"), thus "cleaning" the piping without requiring the removal of equipment.

Thus, in view of the foregoing, we have seen that it is possible to use the pressure of the fluid itself, usually available in an oil well operation, as a pig driving member, which enables the internal "cleaning" of the piping without the extremely high cost of replacing already installed lines located in deep waters and/or of collection stations of ground wells located at great distances, or the need of additional compression facilities.

From the foregoing description, all the advantages and the novelty of the present invention will become apparent; as previously stated, only one preferred embodiment was described, and modifications thereof will be readily understood by those skilled in the art without departing from the scope and the spirit of the invention.

We claim:

1. A device for the interconnection of two flexible flow lines to allow running of pigs from one line to another comprising a modular crossover apparatus disposed adjacent equipment adapted to be located at a subsea production station having two parallel flexible flowline terminals, said apparatus comprising a control valve connected between two curved first pipeline sections, said first pipeline sections having end connectors for connection to the two flexible flowlines and two second pipeline sections having first ends connected to said first pipeline sections intermediate opposite ends thereof respectively and second ends adapted to be connected to said terminals respectively whereby upon selective actuation of the valve to an open position a pig can be launched from a surface facility through one of said flowlines, pass through said crossover apparatus and return through another of the flowlines to clean said another flowline and push all debris back to said surface facility.

2. A device according to claim 1, wherein said first pipeline sections have openings in side walls thereof at connecting points with said second pipeline sections and guide bars extend across said openings to prevent entry of a pig into said second pipeline sections.

* * * * *